United States Patent
Kim et al.

(10) Patent No.: US 12,271,885 B2
(45) Date of Patent: Apr. 8, 2025

(54) SYSTEM AND METHOD FOR DEVICE INITIALIZATION BY SECONDARY USER

(71) Applicant: SHOPIFY INC., Ottawa (CA)

(72) Inventors: Sangwoo Kim, Thornhill (CA); Albert Le, Toronto (CA); Brad Sokol, Toronto (CA); Polly Auyeung, Richmond Hill (CA); Nabeel Chaudhry, Milton (CA); Rahim Damji, Markham (CA)

(73) Assignee: SHOPIFY INC., Ottawa (CA)

( * ) Notice: Subject to any disclaimer, the term of this patent is extended or adjusted under 35 U.S.C. 154(b) by 48 days.

(21) Appl. No.: 17/245,403

(22) Filed: Apr. 30, 2021

(65) Prior Publication Data

US 2022/0351169 A1 Nov. 3, 2022

(51) Int. Cl.
G06Q 20/20 (2012.01)
G06F 21/31 (2013.01)

(52) U.S. Cl.
CPC ........... *G06Q 20/206* (2013.01); *G06F 21/31* (2013.01); *G06Q 20/202* (2013.01)

(58) Field of Classification Search
CPC ..... G06Q 20/206; G06Q 20/202; G06F 21/31
See application file for complete search history.

(56) References Cited

U.S. PATENT DOCUMENTS

| | | | | |
|---|---|---|---|---|
| 9,374,349 B1 * | 6/2016 | Corlett | ................. | G06F 21/335 |
| 9,479,922 B2 * | 10/2016 | Borggaard | ............. | H04W 4/80 |
| 9,686,287 B2 * | 6/2017 | Manton | ................. | G06F 21/335 |
| 10,050,787 B1 * | 8/2018 | Johansson | ............. | H04L 9/0866 |
| 10,867,291 B1 * | 12/2020 | Yien | ..................... | G06F 21/305 |
| 11,432,149 B1 * | 8/2022 | Dhanoa | ..................... | H04L 9/50 |
| 2005/0071630 A1 * | 3/2005 | Thornton | .............. | H04L 9/3226 713/156 |
| 2010/0058053 A1 * | 3/2010 | Wood | .................... | H04L 9/3247 713/155 |
| 2014/0373099 A1 * | 12/2014 | Durbha | .................. | H04L 63/10 726/4 |
| 2015/0059003 A1 * | 2/2015 | Bouse | ................. | G06F 16/2379 726/28 |

(Continued)

OTHER PUBLICATIONS

NPL "What is OAuth? How the open authorization framework works" by J. Fruhlinger and R. Grimes, published in CSO dated Sep. 20, 2019 and available at https://www.csoonline.com/article/562635/what-is-oauth-how-the-open-authorization-framework-works.html (Fruhlinger) (Year: 2019).*

(Continued)

*Primary Examiner* — Florian M Zeender
*Assistant Examiner* — Kimberly S. Bursum
(74) *Attorney, Agent, or Firm* — Smart & Biggar LP

(57) ABSTRACT

Methods and systems for enabling initialization of a device by a secondary user are described. A request is received, from a first device, to initialize the first device with an online account. A notification is transmitted to one or more administrative user devices associated with at least one administrative user associated with the online account, seeking approval of the request to initialize the first device. A response is received from at least one of the one or more administrative user devices, indicating approval to initialize the first device. A credential is transmitted to enable initialization of the first device with the online account.

20 Claims, 7 Drawing Sheets

(56) References Cited

U.S. PATENT DOCUMENTS

| | | | | |
|---|---|---|---|---|
| 2015/0281239 A1* | 10/2015 | Brophy | ............... | G06F 21/6218 |
| | | | | 726/4 |
| 2019/0342753 A1* | 11/2019 | Zhu | ..................... | H04W 12/068 |
| 2020/0104505 A1* | 4/2020 | Wipf | ..................... | G06F 21/572 |
| 2021/0166228 A1* | 6/2021 | Wagner | .............. | G06Q 20/3821 |
| 2022/0222640 A1* | 7/2022 | Mimassi | .............. | G06Q 20/202 |

OTHER PUBLICATIONS

NPL What is OpenID Connect (OIDC), author unknown, date unknown, available at https://www.oauth.com/oauth2-servers/openid-connect/authorization-vs-authentication/ (Year: 2024).*

NPL Mozilla InfoSec, author unknown, date unknown, available at https://infosec.mozilla.org/guidelines/iam/openid_connect.html (Year: 2024).*

* cited by examiner

FIG. 2

SYSTEM AND METHOD FOR DEVICE INITIALIZATION BY SECONDARY USER

FIELD

The present disclosure is related to systems and methods enabling initialization of a device by a secondary user, in which an administrative user can remotely approve initialization of the device by the secondary user. The present disclosure includes systems and methods enabling initialization of a point-of-sale device, among other applications.

BACKGROUND

A retail store may require a point-of-sale (POS) device to be initialized (e.g., registered with a merchant account on a backend server) before the device can be used for POS transactions. The need to initialize the device may arise, for example, when a new device needs to be setup, or when an existing device needs to be reregistered (e.g., after a factory reset was performed on the device). However, the retail workers who are physically at the retail store may be secondary users (also referred to as restricted users) who do not have permission to perform or complete the device initialization (e.g., to avoid the risk that a retail worker might maliciously or accidentally initialize an insecure device or perform unauthorized transactions). An administrative user (e.g., a store owner or manager; also referred to as a primary user or an unrestricted user) who does have permission for device initialization may not be physically present at the retail store.

An existing solution is for the administrative user to provide the secondary user with the administrative user's credential (e.g., login and password, passcode, etc.) via common communication channels (e.g., phone call, email, text message, etc.). This may not be secure. For example, there may be a risk that the credential is intercepted by a third party and/or a risk that the secondary user misuses or reuses (without permission) the administrative user's credential (e.g., the secondary user may use the administrative user's credential to access functionalities of the merchant account that the secondary user should not have permission to access). Often, to mitigate such risks, the administrative user will update their own credential immediately afterwards to avoid misuse or reuse.

Aside from the problem of security, there is also a problem that the existing solution is prone to human error (e.g., the administrative user's credential is mistyped or misheard) and is tedious.

SUMMARY

In various examples, the present disclosure describes methods and systems that enable initialization of a first device by a secondary user who does not have a suitable credential to perform this task. When the secondary user attempts device initialization, a notification is automatically generated to an administrative user, who does have a suitable credential for this task. The administrative user may approve the device initialization remotely. In response to the approval, an administrative credential (which may not be the same as the administrative user's own credential) is transmitted, which is provided to the first device to permit the secondary user to complete the device initialization.

Examples of the present disclosure provide technical improvements in that, through signaling between the first device, a credential manager (which may be implemented on a server), and the administrative user's device, an approval can be remotely obtained from the administrative user. The administrative credential can be transmitted from the credential manager, to enable initialization of the first device. The administrative credential can be transmitted in a more secure manner than in existing solutions. The technical result is that the first device can be initialized, with approval for the initialization being obtained remotely and the credential for initialization being communicated in a more secure manner.

In some examples, the administrative credential may be transmitted from the credential manager directly to the first device, thus bypassing any need for the secondary user to receive or even be aware of the administrative credential. In some examples, the administrative credential may be transmitted from the credential manager to a device associated with the secondary user, which may help to ensure that the device initialization is being attempted by the secondary user and not a third-party.

In some example aspects, the present disclosure describes a computer-implemented method including: receiving, by a server from a first device, a request to initialize the first device with an online account; transmitting, by the server to one or more administrative user devices associated with at least one administrative user associated with the online account, a notification seeking approval of the request to initialize the first device; responsive to the notification, receiving, by the server from at least one of the one or more administrative user devices, a response indicating approval to initialize the first device; and responsive to the response indicating approval to initialize the first device, transmitting, by the server, a credential to enable initialization of the first device with the online account.

In any of the preceding examples, the online account may be a merchant account, the request to initialize the first device may be a request to initialize the first device as a point-of-sale (POS) device associated with the merchant account, and the credential may enable initialization of the first device as the POS device associated with the merchant account.

In any of the preceding examples, the method may include: responsive to the response indicating approval to initialize the first device, generating, at the server, the credential and transmitting the generated credential to enable initialization of the first device with the online account.

In any of the preceding examples, the notification may include an identification of at least one of: a secondary user associated with the request to initialize the first device; an identification of a location associated with the request to initialize the first device; or context information, captured by the first device, associated with the request to initialize the first device.

In any of the preceding examples, the credential may be one of: a digital token; a digital key; a digital certificate; a QR code; a barcode; a password; or a passcode.

In any of the preceding examples, the method may include: prior to transmitting the notification to the one or more administrative user devices, verifying validity of the request to initialize the first device.

In any of the preceding examples, verifying validity of the request to initialize the first device may include at least one of: verifying that the first device is in a valid geographic area associated with the online account; verifying that the request to initialize the first device is from a valid network address associated with the online account; or verifying that the request to initialize the first device is associated with a valid user associated with the online account.

In any of the preceding examples, the credential may be transmitted directly from the server to the first device.

In any of the preceding examples, the credential may be transmitted to a secondary user device associated with a secondary user associated with the request to initialize the first device.

In any of the preceding examples, the credential may be a restricted credential, and validity of the restricted credential may be restricted by at least one of: a defined time limit; a defined number of uses; a defined geographic area; or use by a defined user.

In any of the preceding examples, the initialization of the first device may include registering the first device against the online account.

In any of the preceding examples, the initialization of the first device may include logging in the first device to the online account.

In some example aspects, the present disclosure describes a system include a processor in communication with storage. The processor is configured to execute instructions from the storage to cause the system to: receive, from a first device, a request to initialize the first device with an online account; transmit, to one or more administrative user devices associated with at least one administrative user associated with the online account, a notification seeking approval of the request to initialize the first device; responsive to the notification, receiving, from at least one of the one or more administrative user devices, a response indicating approval to initialize the first device; and responsive to the response indicating approval to initialize the first device, transmitting a credential to enable initialization of the first device with the online account.

In some examples, the processor may be configured to execute instructions to cause the system to perform any of the methods described herein.

In some example aspects, the present disclosure describes a non-transitory computer-readable medium storing instructions that, when executed by a processor of a system, cause the system to: receive, from a first device, a request to initialize the first device with an online account; transmit, to one or more administrative user devices associated with at least one administrative user associated with the online account, a notification seeking approval of the request to initialize the first device; responsive to the notification, receiving, from at least one of the one or more administrative user devices, a response indicating approval to initialize the first device; and responsive to the response indicating approval to initialize the first device, transmitting a credential to enable initialization of the first device with the online account.

In some examples, the computer-readable medium, when executed by the processor, may cause the system to perform any of the methods described herein.

BRIEF DESCRIPTION OF THE DRAWINGS

Reference will now be made, by way of example, to the accompanying drawings which show example embodiments of the present application, and in which:

FIG. 2 is an example homepage of an administrator, which may be accessed via the e-commerce platform of FIG. 1;

Similar reference numerals may have been used in different figures to denote similar components.

DESCRIPTION OF EXAMPLE EMBODIMENTS

Examples of the present disclosure are described in the context of an e-commerce platform. However, it should be understood that the e-commerce platform is only one possible example of an online platform hosting online accounts and is not intended to be limiting. It should be understood that the present disclosure may be implemented in other contexts, and is not necessarily limited to implementation in an e-commerce platform.

The present disclosure describes example methods and systems for initialization of a POS device for a merchant account on an e-commerce platform. It should be understood that the methods and systems described herein may also enable initialization of a device outside of a retail or e-commerce context. For example, the present disclosure may enable a secondary user to complete initialization of any device that requires an administrative credential indicating approval by an administrative user.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
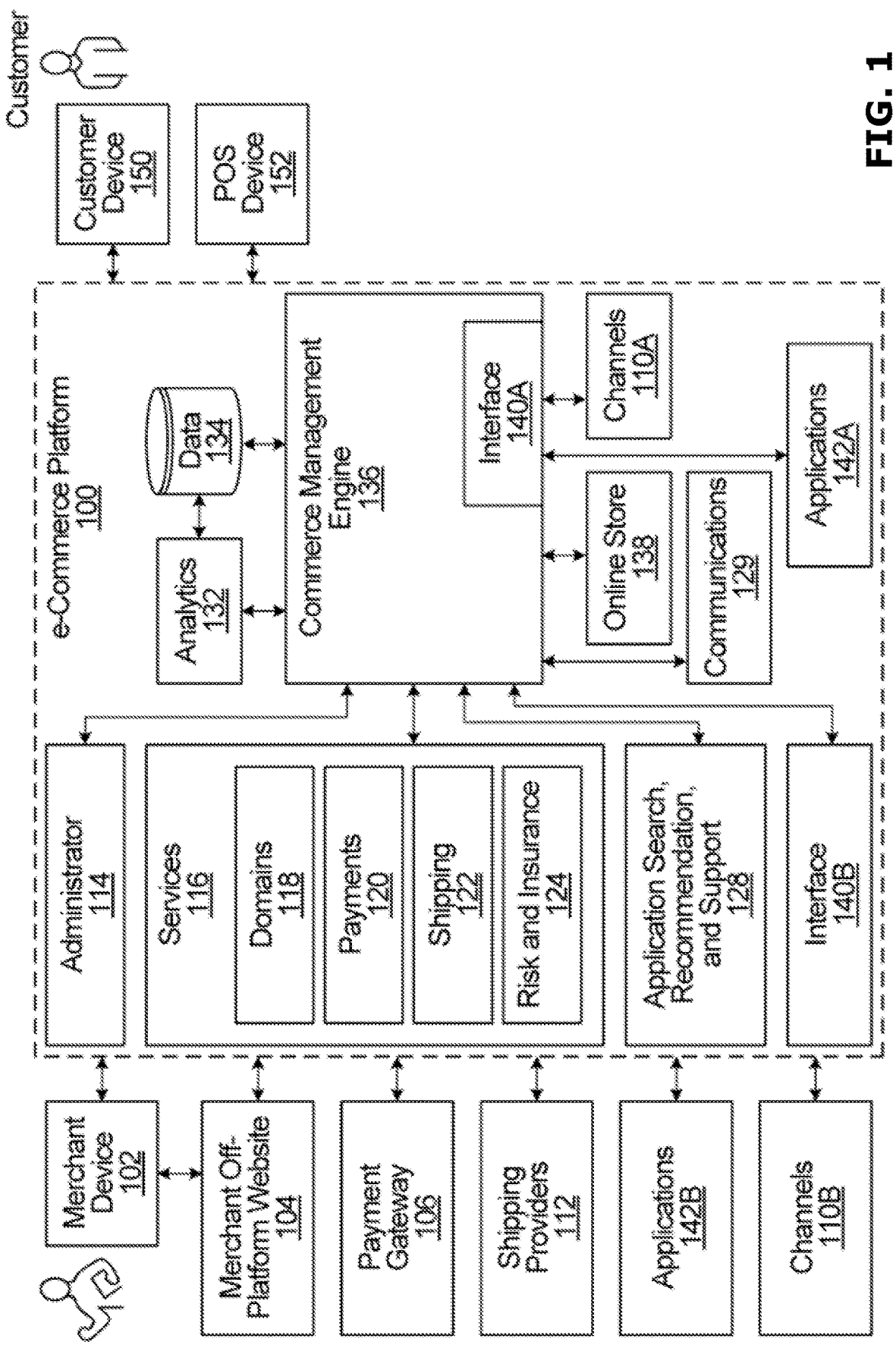
FIG. 1 is a block diagram of an example e-commerce platform, in which examples described herein may be implemented.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
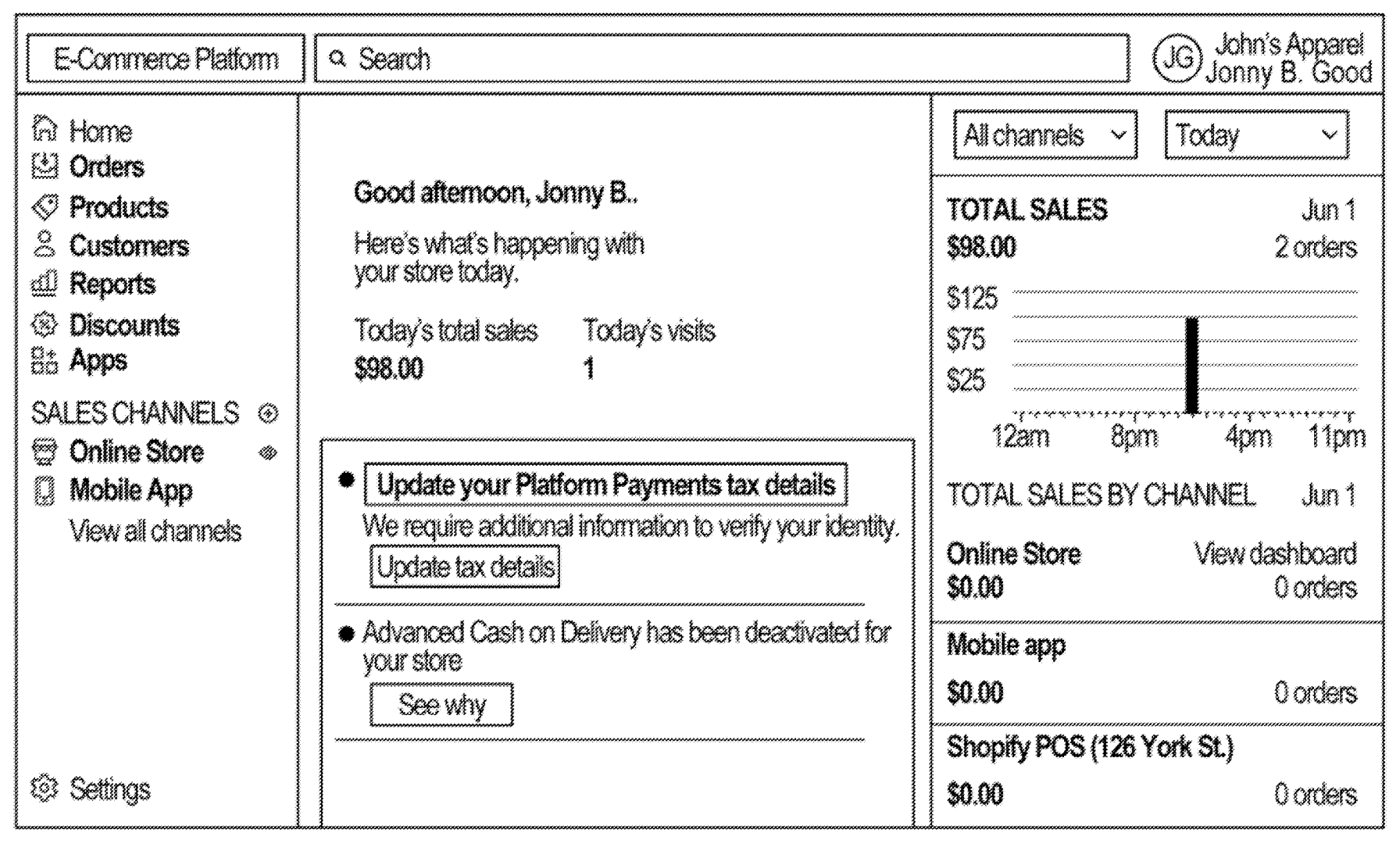

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

In some examples a POS device 152 may be a generic device (e.g., a generic handheld or mobile device, such as a smartphone, a tablet, a laptop, etc.) rather than a specialized device that is dedicated to retail transactions. A generic device may operate as a POS device 152 by installing a POS software application on a generic device.

After the POS software application has been installed on the POS device 152, the POS device 152 may require initialization on the e-commerce platform 100. In particular, the POS device 152 may need to be initialized against the online store 138 or against an account (e.g., a merchant account or an administrative user account). Initialization may include registering the POS device 152 with the online store 138 or account on the e-commerce platform 100. In some examples, initialization may include logging into the POS software application, to enable the POS device 152 to access functionalities of the online store 138 or account on the e-commerce platform 100.

Initialization of the POS device 152 may require an administrative credential or approval from an administrative user (e.g., an owner or manager) associated with the online store 138 or account. After the POS device 152 has been initialized, a secondary user may be required to input a second credential before the POS device 152 can be used for POS transactions. In some examples, the second credential may be used to log the secondary user into the POS application, and to restrict the functionality of the POS application to a subset of functions (e.g., only functions related to POS transactions) permitted for the secondary user.

As will be discussed further below, the present disclosure describes a credential manager, which may be implemented in the e-commerce platform 100 or outside of the e-commerce platform 100, to enable initialization of a POS device 152 (or other device) by a secondary user. It should be understood that examples of the present disclosure may be applicable to any device initialization that requires two types of credentials (e.g., an administrative credential indicating approval by an administrative user, and a second credential provided by a secondary user), and is not necessarily limited to initialization of POS devices 152 in a retail or e-commerce context.

Implementation in an e-Commerce Platform

Figure 3:
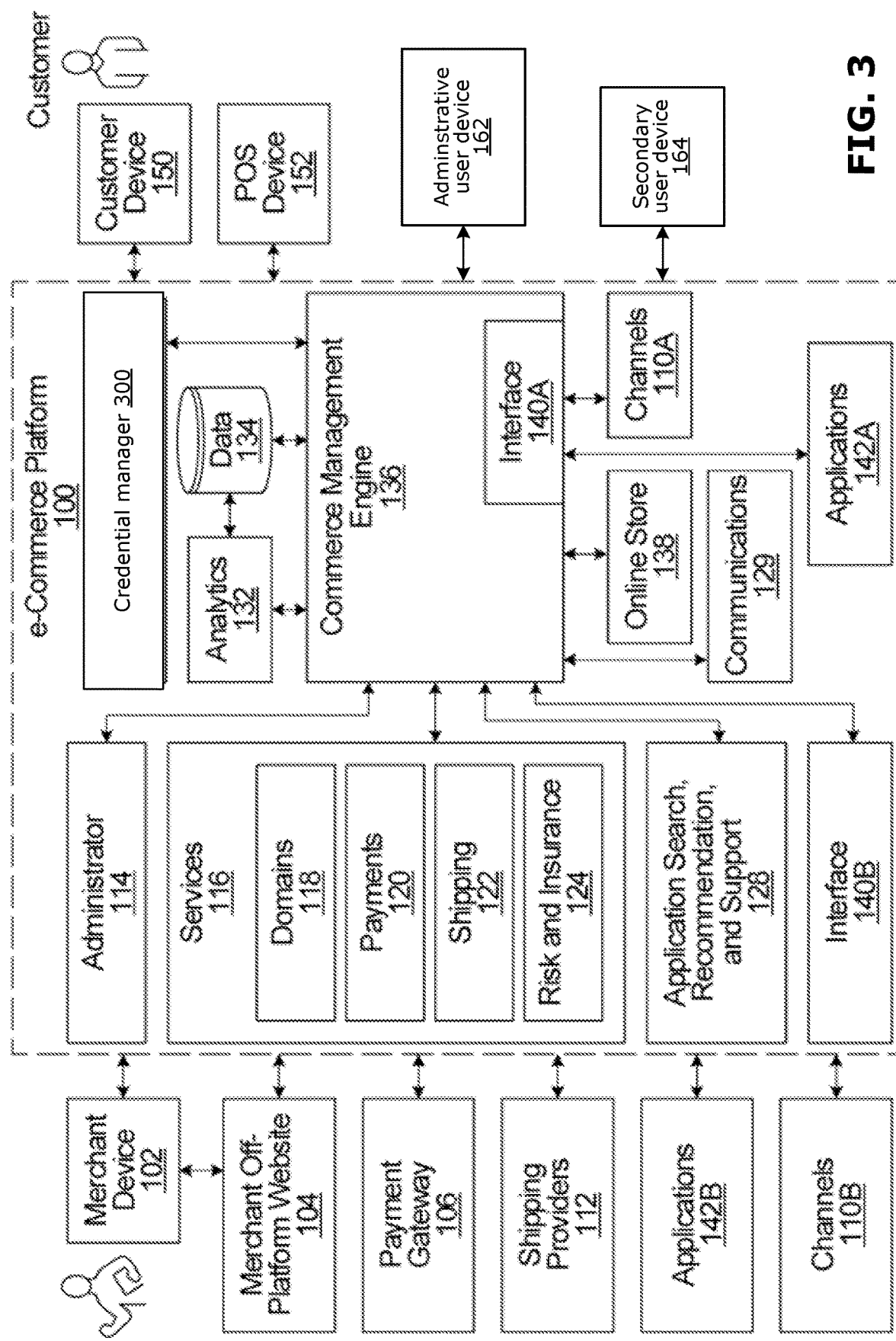
FIG. 3 is another block diagram of an example e-commerce platform, including a credential manager.

The functionality described herein may be used in commerce to provide improved operation of a retail store associated with a merchant account, for example. The e-commerce platform 100 could implement the functionality for any of a variety of different applications, examples of which are described elsewhere herein. FIG. 3 illustrates the e-commerce platform 100 of FIG. 1 but including a credential manager 300. The credential manager 300 is an example of a computer-implemented system that implements the functionality described herein.

Although the credential manager 300 is illustrated as a distinct component of the e-commerce platform 100 in FIG. 3, this is only an example. The credential manager 300 could also or instead be provided by another component residing within or external to the e-commerce platform 100. In some embodiments, either or both of the applications 142A-B may provide an embodiment of the credential manager 300 that implements the functionality described herein. Furthermore, in some embodiments, the credential manager 300 may be implemented as part of the commerce management engine 136. The location of the credential manager 300 may be implementation specific. In some implementations, the credential manager 300 may be provided at least in part by the e-commerce platform 100, either as a core function of the e-commerce platform 100 or as an application 142A-B or service supported by or communicating with the e-commerce platform 100. In some examples, the credential manager 300 may be implemented as a stand-alone service to clients such as a POS device 152 or a merchant device 102. In addition, at least some functions of the credential manager 300 may be implemented in the merchant device 102 and/or in the POS device 152. For example, the POS device 152 could store and run an instance of the credential manager 300 locally as a software application.

As discussed in further detail below, the credential manager 300 may implement at least some of the functionality described herein. Although the embodiments described below may be implemented in association with an e-commerce platform, such as (but not limited to) the e-commerce platform 100 of FIG. 1, the embodiments described below are not limited to e-commerce platforms. For example, the credential manager 300 may be used to manage credentials of any device requiring an administrative credential (possibly in addition to a secondary credential) to perform certain restricted tasks (e.g., device initialization). Thus, the credential manager 300 may be implemented in the context of any online platform hosting online accounts, and is not limited to the e-commerce or retail context.

FIG. 3 illustrates an administrative user device 162 and a secondary user device 164. In the present disclosure, an administrative user is a user who is associated with an online store 138 or merchant account on the e-commerce platform 100, and who has permission to access a larger set of functionalities on the e-commerce platform 100. For example, the administrative user may be a merchant or owner of an online store 138, and may have access to all functionalities provided by the e-commerce platform 100 for managing the online store 138. In another example, the administrative user may be a manager or high-level employee of an online store 138, and may have permission to access many functionalities (but fewer functionalities than that accessible by an owner of the online store 138). In contrast, a secondary user is a user who is associated with an online store 138 or merchant account on the e-commerce platform 100, and who has permission to access a smaller subset of functionalities compared to the administrative user. For example, the secondary user may be a lower-level employee of an online store 138, and may have permission to access only a small subset of functionalities (fewer functionalities than that accessible by a manager or high-level employee). An administrative user may be able to manage the permissions of a secondary user, but not vice versa. A secondary user may also be referred to as a restricted user, and an administrative user may also be referred to as a primary user, an unrestricted user or a low-restriction user.

There may be multiple administrative users and multiple secondary users associated with an online store 138 or merchant account (e.g., there may be multiple owners, high-level employees and lower-level employees associated with an online store). Further, an administrative user may be associated with multiple administrative user devices 162, and a secondary user may be associated with multiple secondary user devices 164. Accordingly, there may be multiple instances of the administrative user device 162 and/or the secondary user device 164. In examples where an administrative user is a merchant associated with an online store 138, the merchant device 102 may also be an administrative user device 162. The administrative user device 162 and the secondary user device 164 may each independently be any suitable computing device, including a desktop computer, laptop computer, mobile computing device, handheld device, and the like.

The operation of the credential manager 300 may be discussed in the context of the credential manager 300 being implemented in the e-commerce platform 100 (e.g., on a first-party server of the e-commerce platform 100). However, as mentioned above, the credential manager 300 may be implemented at least partially outside of the e-commerce platform, for example at least some functions of the credential manager 300 may be implemented by a service provider external to the e-commerce platform 100, in a server of the e-commerce platform 100, in the administrative user device 162 and/or in the POS device 152, among other possibilities.

The credential manager 300 performs operations to automatically generate a notification to an administrative user device 162 when the secondary user attempts initialization of the POS device 152. The notification may seek approval of the initialization attempt. Upon approval from the administrative user device 162, the credential manager 300 transmits an administrative credential (e.g., a credential associated with the administrative user who approved the initialization, or a non-user-specific credential), which is provided to the POS device 152. The administrative credential may be transmitted directly from the credential manager 300 to the POS device 152, or may be transmitted indirectly from the credential manager 300 to the secondary user device 164, then provided (e.g., using manual input, or using machine-to-machine communications) to the POS device 152.

The administrative credential enables the POS device 152 to be initialized (e.g., registered against the online store 138 or merchant account on the e-commerce platform 100). The administrative credential may be retained on the POS device 152, to enable the POS device 152 to continue to be recognized and authorized for certain functionalities (e.g., functionalities for performing POS transactions) on the e-commerce platform 100. Although the POS device 152 has been initialized, a secondary credential (e.g., associated with the secondary user) may also need to be provided to the POS device 152 before the POS device 152 can be used to perform POS transactions.

In the present disclosure, a credential may be any mechanism by which a user or device can be verified. In particular, a credential in the present disclosure refers to a credential that can be accepted digitally, such as a digital token, a digital key, a password, a passcode, or a digital certificate, among others. A credential may or may not be unique to a single user. For example, two or more users having the same level of permission for managing an online store 138 or merchant account on the e-commerce platform 100 may use the same credential (e.g., the same passcode). A credential may have restricted use. For example, a credential may be time-limited, location-limited, device-limited, or task-limited, among other possibilities.

An administrative credential may be a credential associated with an administrative user, or may be a credential associated with an online store 138 or merchant account, but not specific to a single administrative user. For example, there may be multiple administrative users associated with an online store 138 or merchant account (e.g., multiple store co-owners) each with their own user-specific credential, as well as an administrative credential that might not be associated with any one administrative user.

Figure 4:
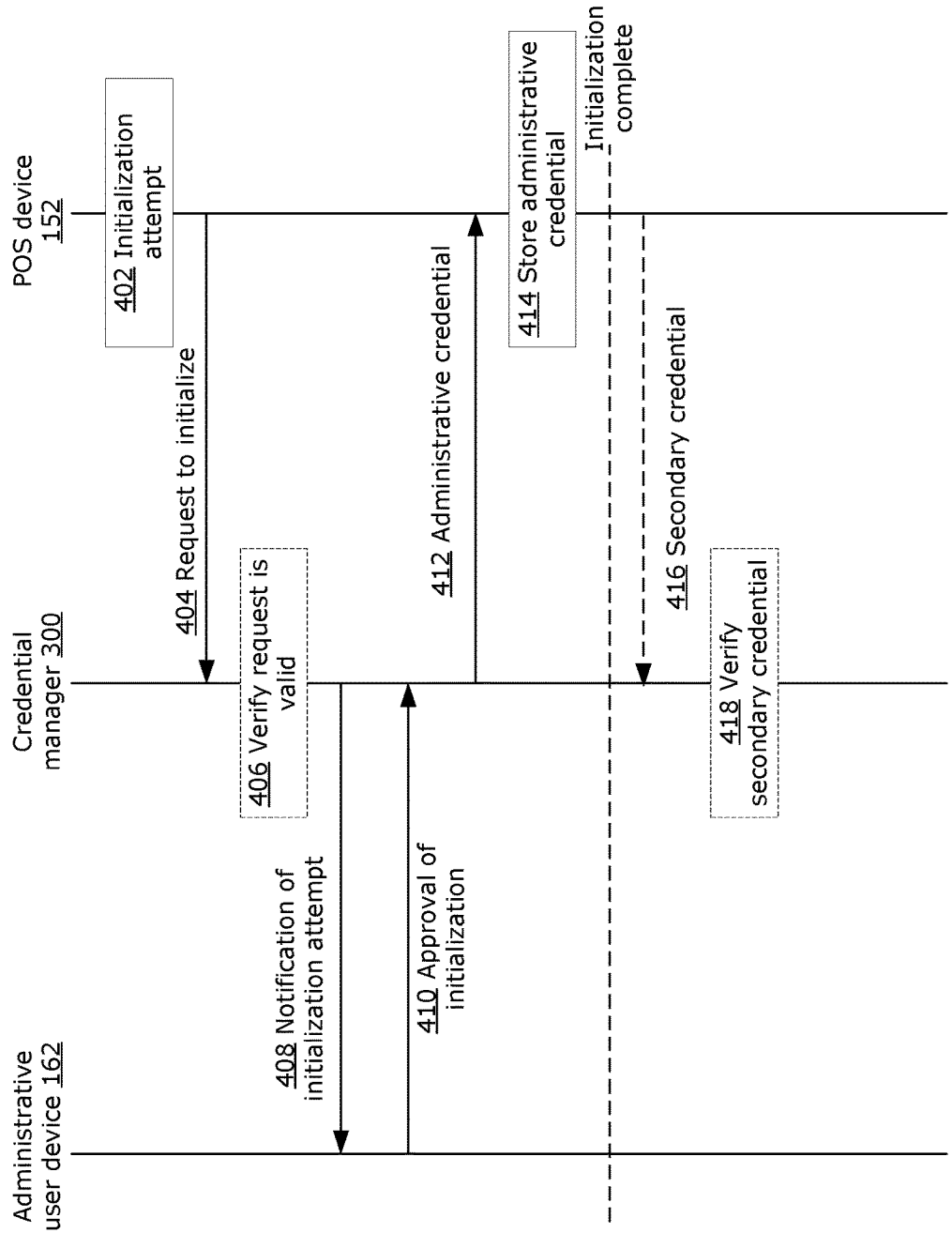
FIGS. 4 and 5 are signaling diagrams illustrating example communications between the credential manager and various devices, for enabling initialization of a first device.
Figure 5:
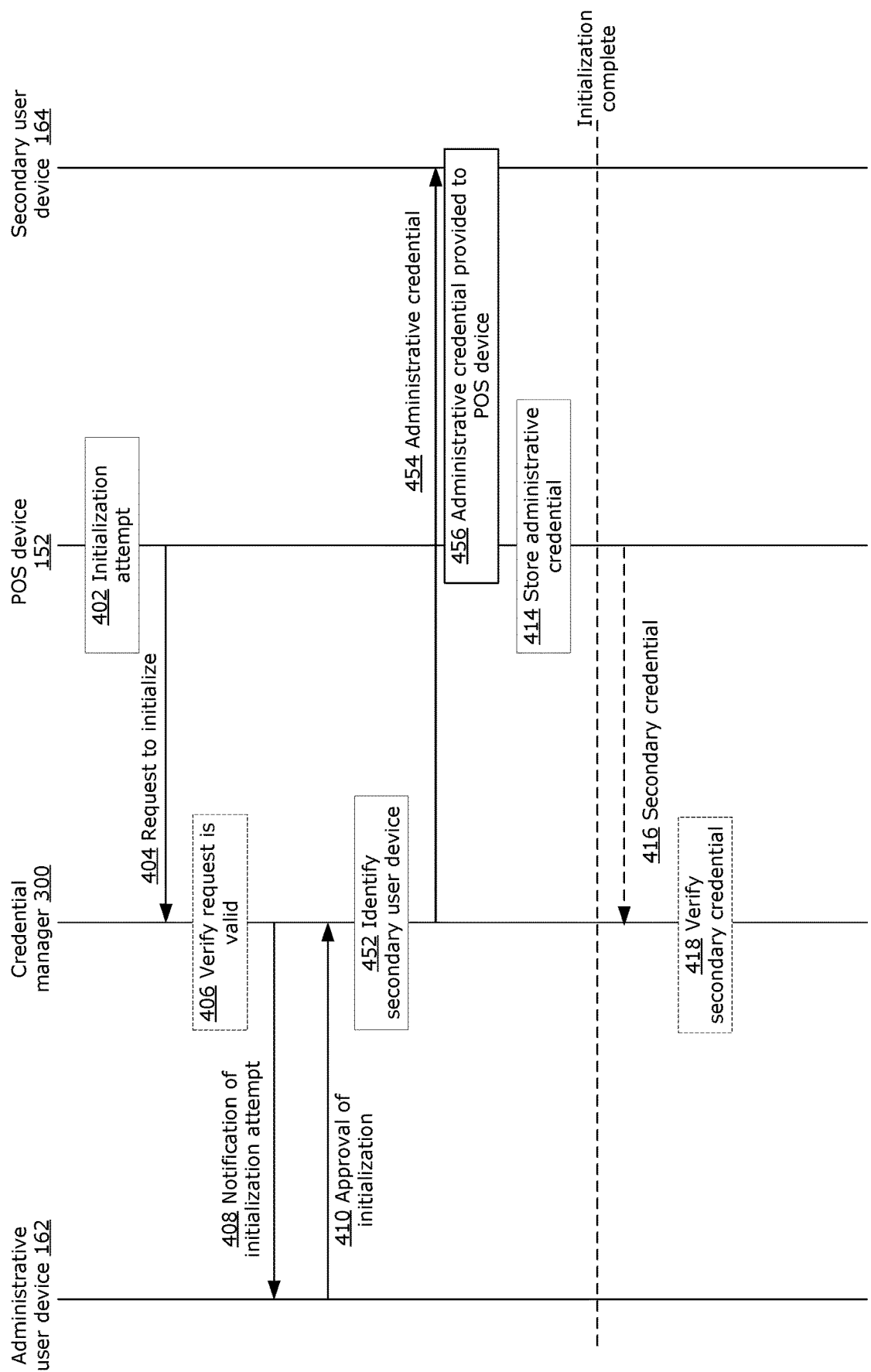

As previously mentioned, the administrative credential may be transmitted directly from the credential manager 300 to the POS device 152, or may be transmitted from the credential manager 300 to the secondary user device 164, then provided to the POS device 152. FIG. 4 illustrates an example in which the administrative credential is transmitted directly from the credential manager 300 to the POS device 152, and FIG. 5 illustrates an example in which the administrative credential is transmitted from the credential manager 300 to the secondary user device 164.

FIG. 4 is a signaling diagram illustrating example communications between the credential manager 300, POS device 152, and administrative user device 162. As previously mentioned, the credential manager 300 may be implemented on the e-commerce platform 100 (e.g., in a server of the e-commerce platform 100), or outside of the e-commerce platform 100 (e.g., in a third-party server, in the POS device 152, or in the administrative user device 162), or a combination thereof. The following discussion is in the context of an example in which the credential manager 300 is implemented in a server of the e-commerce platform 100.

At 402, an initialization attempt is made on the POS device 152. For example a secondary user (e.g., a retail worker) may attempt to register the POS device 152 with an online store 138 or merchant account on the e-commerce platform 100, or may attempt to log into a POS application on the POS device 152 (e.g., in order to carry out a POS transaction for an online store 138 or merchant account hosted on the e-commerce platform 100). In some examples, the initialization attempt may include input of a secondary credential (e.g., a passcode or password associated with the secondary user), a secondary user identifier (e.g., a unique username or user number) and/or other information such as an identification (e.g., a store number) of a retail store associated with the initialization attempt.

The initialization attempt causes the POS device 152 to transmit a request to initialize, at 404, to the credential manager 300 at the e-commerce platform 100. Optionally, the request to initialize may include information included in the initialization attempt, such as the secondary user identifier, secondary credential and/or the identification of the retail store.

Optionally, at 406, the credential manager 300 may verify that the request to initialize is valid. The credential manager 300 may use information optionally included in the request to initialize, information obtained by querying the POS device 152 and/or information extracted from the request itself to perform this verification. For example, the credential manager 300 may verify whether the location of the POS device 152 (e.g., obtained by querying GPS data from the POS device 152) matches a location that is associated with (e.g., on record in data maintained by the e-commerce platform 100) the online store 138 or merchant account; whether the request to initialize is from a network (e.g., as indicated by the IP address of the request) that is associated with the online store 138 or merchant account; whether the secondary credential provided with the request is a valid credential associated with the online store 138 or merchant account; or whether the POS device 152 is a registered device associated with the online store 138 or merchant account; among other possibilities.

If the optional verification at 406 fails, the credential manager 300 may automatically refuse the request to initialize. Optionally, if the verification at 406 fails, the credential manager 300 may transmit a notification to the administrative user device 162 indicating the failed initialization attempt. Such a notification may alert the administrative user to the possibility of a malicious initialization attempt, for example.

If the optional verification at 406 is successful or is not performed, the credential manager 300 transmits a notification of the initialization attempt, at 408, to the administrative user device 162. For example, the credential manager 300 may identify (e.g., from data maintained by the e-commerce platform 100) one or more administrative users associated with the online store 138 or merchant account, and one or more administrative user devices 162 associated with at least one administrative user. The credential manager 300 may then transmit the notification at 408 to one or more administrative user devices 162 (associated with one or more administrative users). The notification may optionally include information that may help the administrative user to determine whether to approve the initialization attempt. For example, the notification may optionally include the secondary user identifier and/or an identification of the retail store, which may have been included in the request to initialize transmitted at 404. The notification may seek approval of the request to initialize the POS device 152, for example the notification may include selectable options (e.g., user interface buttons) to approve or reject the initialization attempt. The notification may also require input of a credential associated with the administrative user (e.g., the administrative user's own credentials) in order to approve the initialization attempt.

If the administrative user approves the request to initialize the POS device 152 (and optionally provides the required credential from the administrative user), the administrative user device 162 transmits an approval of initialization, at 410, to the credential manager 300. If the notification of initialization attempt at 408 was transmitted to multiple administrative user devices 162, it may be sufficient for a single administrative user device 162 to transmit the approval of initialization at 410.

In response to receiving an approval of initialization from at least one administrative user device 162, the credential manager 300 transmits an administrative credential, at 412, to the POS device 152. The administrative credential may be transmitted in a machine-readable format (e.g., digital token, digital certificate, digital key, etc.). In some examples, the credential manager 300 may also automatically perform operations to initialize the POS device 152 on the e-commerce platform 100 (e.g., register the POS device 152 with the online store 138 or merchant account, create a profile of the POS device 152 with the online store 138 or merchant account, etc.).

In response to receiving the administrative credential, the POS device 152 stores the administrative credential at 414. Storing the administrative credential by the POS device 152 may enable the POS device 152 to be verified by the credential manager 300 in the future, for example. The POS device 152 may additionally or alternatively use the administrative credential to perform operations for POS transactions (e.g., to log into a POS application to perform POS transactions) on the POS device 152. The administrative credential may be automatically used by the POS device 152, after receipt from the credential manager 300, to perform operations to initialize itself (e.g., to automatically log into a POS application and/or to automatically complete registration). Initialization of the POS device 152 may be considered to be complete at this point. Subsequent communications and operations, described below, may be performed to enable the secondary user to perform POS transactions using the initialized POS device 152.

Optionally, the secondary credential may be transmitted by the POS device 152, at 416, to the credential manager 300. The secondary credential may be, for example, a secondary user login and password, a secondary user login and passcode, a secondary user fingerprint, or any other credential that may be provided to verify that the POS device 152 is being used by a valid secondary user. For example, the secondary credential may be transmitted at 416 if the secondary credential was not included in the request to initialize transmitted at 404. The secondary credential may also be transmitted at 416 to start a new POS session after logging out of a previous POS session. This may be the case, for example, where each secondary user (e.g., retail worker) must log into their own POS session on the POS device 152 to carry out POS transactions. In response to receiving the secondary credential, the credential manager 300 verifies the received credential against stored records (e.g., a record of valid credentials associated with the online store 138 or merchant account). If verification is successful, then the POS device 152 can be used to perform POS transactions with the e-commerce platform 100.

In some examples, instead of the credential manager 300 verifying the secondary credential associated with the secondary user, the secondary credential may be verified locally at the POS device 152 (e.g., the secondary user may be required to log into the POS application on the POS device 152).

FIG. 5 is a signaling diagram illustrating example communications between the credential manager 300, POS device 152, secondary user device 164 and administrative user device 162. Similar to FIG. 4, the credential manager 300 may be implemented on the e-commerce platform 100 (e.g., in a server of the e-commerce platform 100), or outside of the e-commerce platform 100 (e.g., in a third-party server, in the POS device 152, or in the administrative user device 162), or a combination thereof. The following discussion is in the context of an example in which the credential manager 300 is implemented in a server of the e-commerce platform 100.

Some of the signaling and operations illustrated in FIG. 5 are similar to that of FIG. 4, are shown with the same reference numbers, and will not be discussed again in detail. Communications and operations 402, 404, 406, 408 and 410 have been described above and may be carried out as previously described with respect to FIG. 4.

In the example of FIG. 5, in response to receiving the approval of initialization that was transmitted by at least one administrative user device 162 at 410, the credential manager 300 at 452 identifies at least one secondary user device 164. For example, the credential manager 300 may use information (e.g., a passcode or password associated with the secondary user, a secondary user identifier, etc.) from the request to initialize (transmitted at 404) to reference data stored by the e-commerce platform 100. For example, there may be a record of secondary user devices 164 and associated secondary user identifier, password and/or passcode, stored in association with the online store 138 or merchant account. Using the secondary user identifier, passcode or password, the credential manager 300 may look up the associated secondary user device 164.

Having identified the secondary user device 164, the credential manager 300 transmits the administrative credential, at 454, to the identified secondary user device 164. If there are multiple secondary user devices 164 associated with the secondary user identifier, passcode or password, the credential manager 300 may transmit the administrative credential to all identified secondary user devices 164, or to only one secondary user device 164. The administrative credential may be transmitted at 454 in a format that is understandable to humans (e.g., in a text format or audio format) and/or in a machine-readable format (e.g., a scannable format such as a Quick Response (QR) code or barcode). For example, a QR code or barcode is a type of machine-readable code that can be scanned by an optical sensor. A QR code can be used to encode data (e.g., the administrative credential) in a more efficient way than a barcode, although this is not intended to be limiting.

After the administrative credential has been transmitted to the secondary user device 164 at 454, the administrative credential may be provided to the POS device 152 at 456. For example, the secondary user may view an alphanumeric administrative credential (e.g., a password or passcode) on the secondary user device 164 and manually enter the administrative credential into the POS device 152. In another example, a scannable, machine-readable administrative credential may be displayed on the secondary user device 164 and the secondary user may use the POS device 152 to scan (e.g., using a camera unit, an infrared unit or other optical unit on the POS device 152) the displayed administrative credential. Other techniques may be used to provide the administrative credential to the POS device 152 (e.g., using near-field communications, etc.).

After the administrative credential has been received by the POS device 152, the administrative credential may be stored at the POS device 152 at 414 (as described with respect to FIG. 4) and initialization may be considered complete. Additional communications and operations may be performed (e.g., at 416 and 418), as described above.

Figure 6:
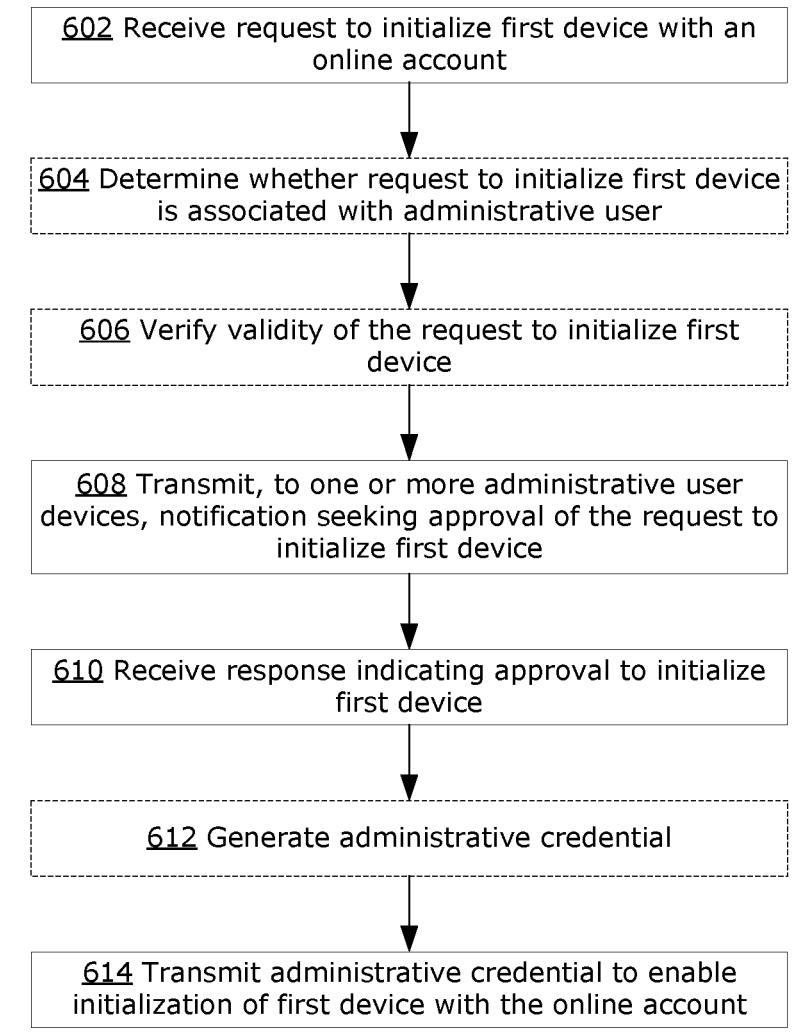
FIG. 6 is a flowchart illustrating an example method, performed by a server, for enabling initialization of a first device.

FIG. 6 is a flowchart illustrating an example method 600, which may be performed by a server (e.g., a server implementing the credential manager 300). For example, the credential manager 300 may be part of the e-commerce platform 100 (e.g., the credential manager 300 may be implemented in a server of the e-commerce platform 100). The method 600 may be performed using other implementations of the credential manager 300, such as using a cloud computing platform or virtualized computing resources. As previously mentioned, the credential manager 300 may also be implemented in other online platforms, without being limited to retail or e-commerce applications.

At an operation 602, a request is received to initialize a first device with an online account (e.g., a request to initialize the first device as a POS device 152 associated with a merchant account or online store 138 on the e-commerce platform 100). In some examples, the request to initialize the first device may include a credential associated with the user making the request. The request to initialize the first device may also include information about the user making the request (e.g., a user identifier), information about the first device (e.g., a device identifier or a geographic location of the device) and/or information about the context of the first device (e.g., an identifier of a location where the first device will be used, such as a store identifier in the case where the first device is intended to be used as a POS device 152 in a retail store). In some examples the first device may automatically or in response to a request from the credential manager 300 capture information about the context of the first device. For example, the first device may capture a log of recent activity (e.g., a log of recent POS transactions performed on the first device, in the case where the first device is a POS device 152), capture geographic information (e.g., a GPS location), capture network information (e.g., a local network address), capture a screenshot (e.g., showing the initialization task being attempted on the first device), or capture a photograph (e.g., showing a face of the user attempting to initialize the first device), among other possibilities. Such captured information may be received from the first device together with or following the request to initialize the first device.

Optionally, at an operation 604, a determination is made whether the request to initialize the first device is associated with an administrative user. For example, if the request to initialize the first device includes a credential associated with the user making the request, the credential may be a credential that is associated with an administrative user (e.g., the credential associated with the administrative user may be a user-specific administrative credential). In another example, if the request to initialize the first device includes a device identifier, the device identifier may be associated with an administrative user (e.g., as indicated in a user profile associated with the online account). If the request to initialize the first device is associated with an administrative user, then there may not be any need to seek approval of the request to initialize the first device and the method may omit operations 606-612, or the method 600 may end. The method 600 may continue with operations 606-612 if it is determined that the request to initialize the first device is not associated with an administrative user and the first device has not been initialized.

Optionally, at an operation 606, the validity of the request to initialize the first device may be verified. Verifying the validity of the initialization request may be based on information (e.g., information identifying the user associated with the initialization request, information identifying a location associated with the initialization request, or other context information including information captured by the first device) included with or received subsequent to the request at operation 602. If the required information for verifying the initialization request was not included in the request received at operation 602, a request for the required information (e.g., request to provide a user credential, request to provide a user identifier, request to provide a device identifier, request to share GPS data, request to share network information, request to input a location identifier, etc.) may be transmitted to the first device.

For example, verification may be based on verifying that the first device is at a valid location (e.g., within a defined geographic region, within a defined geofence, or within a defined distance from a defined valid location), where the valid location is associated with the online account (e.g., indicated in a profile associated with the online account). In examples where the method 600 is for initialization of a POS device 152 associated with an online store 138 or merchant account on the e-commerce platform 100, the valid location may correspond to a physical geographical location of a retail store (or a geographical area in the vicinity of the retail store) associated with the online store 138 or merchant account. In another example, verification may be based on verifying that the request to initialize the first device is from a valid network address, where the valid network address is associated with the online account. In examples where the method 600 is for initialization of a POS device 152 associated with an online store 138 or merchant account on the e-commerce platform 100, the valid network address may correspond to the network address of a retail store associated with the online store 138 or merchant account. In another example, verification may be based on verifying that the request to initialize the first device is associated with a valid user associated with the online account, such as by verifying whether a user credential or user identifier is a valid credential or identifier associated with the online account.

If the optional verification at operation 606 fails, a notification may be generated to one or more administrative users associated with the online account, to notify the administrative user(s) of the failed device initialization attempt. The method 600 may then end. If the optional verification at operation 606 is successful, the method 600 proceeds to operation 608.

At an operation 608, a notification seeking approval of the request to initialize the first device is transmitted to one or more administrative user devices 162 associated with the online account. The administrative user device(s) 162 may be associated with at least one administrative user associated with the online account. That is, there may be one or more administrative users associated with the online account (e.g., if the online account is a merchant account or an online store 138, there may be multiple store owners and/or multiple store managers who are considered to be administrative users), and each administrative user may be associated with respective one or more administrative user devices 162 (e.g., any single administrative user may have access to multiple administrative user devices 162).

The notification transmitted at operation 608 may include information that helps the administrative user(s) make a decision whether to approve the initialization request. The information included in the notification may be information that was included with the initialization request received at operation 602 and/or that was received from the first device subsequently. For example, the notification may include an identification of the user associated with the request to initialize the first device (e.g., the user identifier included with the request received at operation 602), an identification of a location associated with the request to initialize the first device (e.g., the location of the first device, or an identification of a store in the case where the first device is being initialized as a POS device 152), and/or context information captured by the first device, among other possibilities. The notification may request approval of the request to initialize the first device. The notification may also request that the administrative user provide a valid credential associated with the administrative user.

At an operation 610, a response is received from at least one of the administrative device(s) 162 indicating approval to initialize the first device. If the notification was transmitted to multiple administrative user devices 162 at operation 608, it may be sufficient to receive the response indicating approval from at least one of the administrative user devices 162.

Optionally, at an operation 612, after receiving the response indicating approval to initialize the first device, an administrative credential may be generated. For example, the administrative credential may be generated as a restricted credential. A restricted credential is a credential whose validity is restricted in some way. For example, a restricted credential may be valid only for a defined number of uses (e.g., one-time use, or maximum 10 uses, etc.), only for a defined period of time (e.g., valid for only the next hour, valid for only 24 hours, etc.), only for use within a defined geographic area (e.g., valid only for use at or near the location where the request to initialize was sent), only for use with a defined device (e.g., valid only for use with the device from which the request to initialize was sent), only for use together with a defined user identifier or credential (e.g., valid only for use together with the user credential included with the request to initialize), combinations of different restrictions, etc. Generating the administrative credential in this way may enable the credential manager 300 to apply security features (e.g., restrictions) to the administrative credential, which may help to reduce misuse or unauthorized reuse of the administrative credential.

At an operation 614, the administrative credential is transmitted to enable initialization of the first device with the online account. The administrative credential may be a restricted credential (e.g., generated at optional operation 612), may be a credential associated with the administrative user from whose administrative user device 162 the approval response was received at operation 610 (e.g., may be the administrative user's own credential provided with approval of the initialization request), or may be an administrative credential that has been previously used (e.g., previously generated and stored by the credential manager 300 in association with the online account), among other possibilities.

The administrative credential may be a machine-readable credential (e.g., a digital token, a digital key, a digital certificate, a QR code, a barcode, etc.) and/or a human-readable credential (e.g., a password, a passcode, etc.).

The administrative credential may be transmitted directly to the first device. In examples where the administrative credential is transmitted directly to the first device, the first device may be automatically initialized using the transmitted administrative credential. For example, the first device may automatically perform local operations to initialize itself (e.g., may automatically log into an application, such as a POS application, associated with the online account).

Alternatively or additionally, the administrative credential may be transmitted to a secondary user device 164, where the secondary user device 164 is associated with the user associated with the request to initialize the first device. For example, the secondary user device 164 may be identified by using the user identifier (e.g., included with the request to initialize the device at operation 602) to reference a record of device(s) associated with the user identifier, in a record associated with the online account. The administrative credential may then be provided to the first device, for example by manual input, by the first device scanning a machine-readable credential displayed on the secondary user device 164, or by communication (e.g., near-field communications) between the secondary user device 164 and the first device, among other possibilities.

In some examples, the initialization of the first device may include registering the first device against the online account. For example, where the first device is being initialized as a POS device 152 associated with an online store 138 or merchant account, initialization of the first device may include registering the first device as a POS device 152 associated with the online store 138 or merchant account on the e-commerce platform 100. Registration of the first device may include registering the first device in association with the administrative credential. The first device may persistently store the administrative credential (e.g., may store the administrative credential in local long-term storage), so that the first device will be recognized as a valid registered device for the online account in the future.

Figure 7:
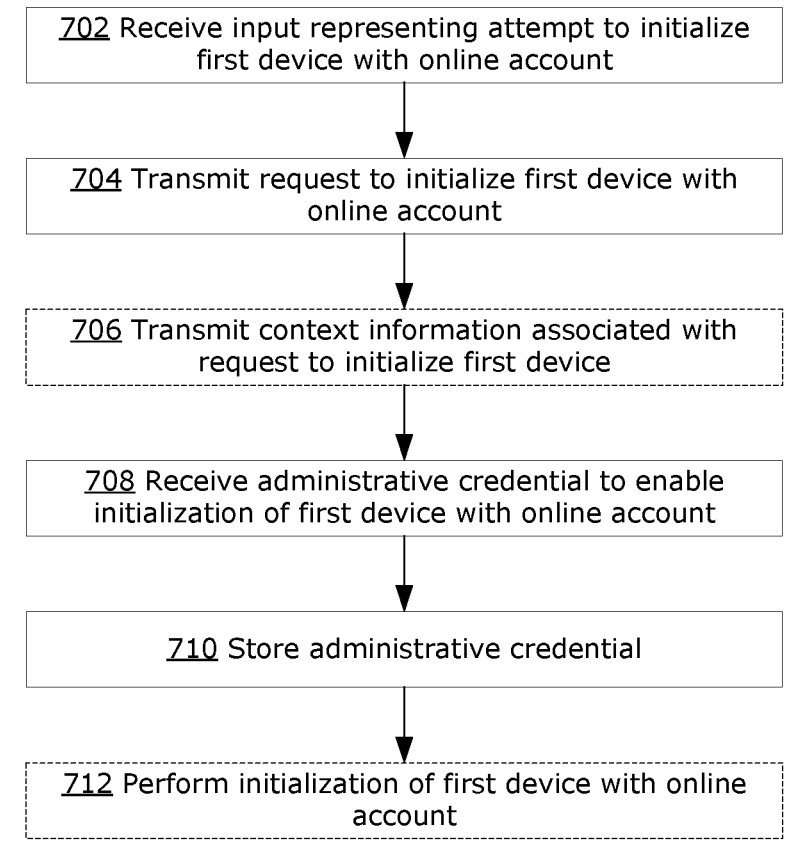
FIG. 7 is a flowchart illustrating an example method, performed by the first device.

FIG. 7 is a flowchart illustrating an example method 700, which may be performed by the first device, in communication with the credential manager 300. In some examples, the method 700 may be performed to initialize the first device as a POS device 152 associated with an online store 138 or merchant account of an e-commerce platform 100. The method 700 may also be performed to initialize the first device in other contexts, and is not necessarily limited to retail or e-commerce applications.

At an operation 702, an input is received at the first device, where the input represents an attempt to initialize the first device with an online account. For example, the input may be an attempt to use the first device to account the online account. In an example retail context, the input may represent an attempt to load up or gain access to a POS application executed on the first device.

At an operation 704, in response to the input at operation 702, a request is transmitted to the credential manager 300 (e.g., to a server at which the credential manager 300 is implemented), to initialize the first device with the online account. For example, the request may be a request to initialize the first device as a POS device 152 associated with a merchant account or online store 138 on the e-commerce platform 100.

Optionally, at an operation 706, context information associated with the request to initialize the first device may be transmitted to the credential manager 300. The context information may be transmitted together with the request at operation 704, or may be transmitted subsequent to the request at operation 704 (e.g., may be transmitted in response to a request from the credential manager 300). In some examples, at least some of the context information may be provided by the input at operation 702.

The context information may include, for example, a credential associated with the user making the request, information about the user making the request (e.g., a user identifier), information about the first device (e.g., a device identifier or a geographic location of the device) and/or information about the context of the first device (e.g., an identifier of a location where the first device will be used, such as a store identifier in the case where the first device is intended to be used as a POS device 152 in a retail store). In some examples, the context information may include information captured by the first device. For example, the first device may capture a log of recent activity (e.g., a log of recent POS transactions performed on the first device, in the case where the first device is a POS device 152), capture geographic information (e.g., a GPS location), capture network information (e.g., a local network address), capture a screenshot (e.g., showing the initialization task being attempted on the first device), or capture a photograph (e.g., showing a face of the user attempting to initialize the first device), among other possibilities.

At an operation 708, an administrative credential is received, to enable initialization of the first device with the online account. For example, the administrative credential may enable the first device to be initialized as a POS device 152 associated with an online store 138 or merchant account on the e-commerce platform 100.

In some examples, the administrative credential may be received directly from the credential manager 300, in a machine-readable format (e.g., a digital token, a digital key, a digital certificate, a QR code, a barcode, etc.). In other examples, the administrative credential may be received by the first device via user input (e.g., user input of a password or passcode) or via communications with a secondary user device 164 (e.g., by scanning a QR code or barcode displayed on the secondary user device 164, or by near-field communications with the secondary user device 164).

At an operation 710, the administrative credential may be stored by the first device. For example, the administrative credential may be persistently stored in a local long-term storage of the first device, to enable the first device to be recognized as having been initialized with the online account.

Optionally, at an operation 712, the first device may perform initialization of itself with the online account. In examples where the administrative credential is transmitted directly to the first device, the first device may be automatically initialized using the transmitted administrative credential, in response to receipt of the administrative credential. For example, the first device may automatically perform operations to initialize itself (e.g., may automatically log into an application, such as a POS application, associated with the online account).

In some examples, the initialization of the first device may include registering the first device against the online account. For example, where the first device is being initialized as a POS device 152 associated with an online store 138 or merchant account, initialization of the first device may include registering the first device as a POS device 152 associated with the online store 138 or merchant account on the e-commerce platform 100. Registration of the first device may include registering the first device in association with the administrative credential. The first device may persistently store the administrative credential (e.g., may store the administrative credential in local long-term storage), so that the first device will be recognized as a valid registered device for the online account in the future.

In other examples, the first device may not need to perform any operations to initialize itself. For example, the first device may be automatically initialized at the server managing the online account, in response to an administrative user device 162 providing remote approval to initialize the first device.

In some examples, the methods and systems of the present disclosure may be used to enable an administrative user to remotely approve other device operations, in addition to or instead of device initialization, that require an administrative credential. A secondary user may be restricted from performing certain operations related to an online account without approval from an administrative user associated with the online account. For example, a secondary user may only have permission to view data associated with the online account and may not make changes to the data without approval from an administrative user. In another example, a secondary user may be permitted to only perform certain updates to the data associated with the online account (e.g., may only update existing user profiles associated with the online account) and may not perform other updates (e.g., may not create new user profiles or delete existing user profiles) without approval from an administrative user. In a retail context, a secondary user may only use a POS device 152 (which has been already initialized) to perform a defined set of unrestricted POS tasks (e.g., completing a sale) for an online store 138 or merchant account, and may not use the POS device 152 to perform a defined set of restricted POS tasks (e.g., refunding a sale, cancelling an order, applying a discount, etc.) without approval from an administrative user (e.g., a manager or owner) associated with the online store 138 or merchant account.

The example methods and systems described above may be used to automatically generate a notification to one or more administrative user devices 162 (associated with one or more administrative users) when a restricted task is attempted on the first device (e.g., the POS device 152) by a secondary user.

For example, when a user attempts to perform a restricted task on the first device, the user may be asked to provide a credential (e.g., a password, passcode, etc.). The credential provided by the user may be verified locally on the first device (e.g., by a POS application, in the case where the first device is a POS device 152), or may be verified by the credential manager 300. If the credential that is provided is an administrative credential (or a credential associated with an administrative user), the restricted task may be permitted. If the credential that is provided is not an administrative credential (e.g., is a secondary credential) or if no credential is provided, the credential manager 300 may generate a notification to one or more administrative user devices 162 (associated with one or more administrative users) indicating the restricted task attempt and seeking approval for the restricted task.

To help the administrative user(s) to make a decision whether or not to approve the restricted task, the first device (e.g., the POS device 152) may, at the time the restricted task is being attempted, capture context information. For example, the first device may capture a log of recent activity (e.g., a log of recent POS transactions performed on the first device, in the case where the first device is a POS device 152), capture geographic information (e.g., a GPS location), capture network information (e.g., a local network address), capture a screenshot (e.g., showing the restricted task being attempted on the first device), or capture a photograph (e.g., showing a face of the user attempting to perform the restricted task on the first device), among other possibilities. Such captured information may be communicated from the first device to the credential manager 300, together with or following a request to perform the restricted task. The credential manager 300 may include such captured information in the notification transmitted to the administrative user device(s) 162.

After the notification is received by one or more administrative user devices 162, approval of the restricted task may be transmitted back to the credential manager 300 and the credential manager 300 may transmit an administrative credential to enable the restricted task to be performed, similar to the operations described above.

It should be noted that the administrative credential that enables the restricted task to be performed may or may not be the same as the administrative credential that enables the first device to be initialized. Further, the administrative credential enabling the restricted task to be performed may be used in a manner different from the administrative credential that enables the first device to be initialized. For example, because the restricted task may be expected to be a one-time task, the administrative credential permitting the restricted task to be performed may be more restricted in use (e.g., restricted to one-time use) and/or may not be persistently stored by the first device. In some examples, it may not be necessary to transmit the administrative credential to the first device in order to enable the restricted task to be performed by the first device. For example, after receiving the approval from at least one administrative user device 162, the first device may be permitted to perform the restricted task a single time (or for a defined period of time, such as 30 minutes).

In various examples, the present disclosure has described methods and systems that enable an administrative user to remotely provide approval for a restricted task (e.g., device initialization) being attempted by a secondary user on a first device (e.g., a POS device).

The examples of the present disclosure may be applied in a retail or e-commerce context, although the present disclosure is not limited to retail or e-commerce applications.

In a retail context, the present disclosure may enable a generic computing device (e.g., a generic laptop, tablet or smartphone device) to be initialized for use as a POS device, without requiring an administrative user to be physically present. This may enable the generic computing device to be used for performing POS transactions, instead of a specialized POS device (e.g., cashier station, handheld device with built-in card reader, etc.). Thus, the present disclosure, in at least some examples, provides an improvement to the functioning of a computing device.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method comprising:
receiving, by a server from a first device, a request associated with a secondary user to initialize the first device with an online account;
generating, at the server, a machine-readable credential to enable initialization of the first device with the online account by:
transmitting, by the server to one or more administrative user devices associated with at least one administrative user associated with the online account, the at least one administrative user being different from the secondary user, a request for input of a first credential specific to the at least one administrative user to approve the request to initialize the first device;
receiving, by the server from at least one of the one or more administrative user devices, a response indicating input of the first credential specific to the at least one administrative user; and
responsive to the response received from the at least one of the one or more administrative user devices, generating, at the server, the machine-readable credential that is different from the first credential, the machine-readable credential being useable by the secondary user and being not specific to the at least one administrative user; and
transmitting, by the server, the machine-readable credential to a secondary user device associated with the secondary user, the machine-readable credential being scannable by the first device to enable initialization of the first device with the online account.

2. The method of claim 1,
wherein the online account is a merchant account;
wherein the request to initialize the first device is a request to initialize the first device as a point-of-sale (POS) device associated with the merchant account; and
wherein the machine-readable credential enables initialization of the first device as the POS device associated with the merchant account.

3. The method of claim 1, wherein the request for input of the first credential includes information to enable the at least one administrative user to make a decision to approve the request to initialize the first device, the information including an identification of at least one of:
the secondary user associated with the request to initialize the first device;
an identification of a location associated with the request to initialize the first device; or
context information that was captured by the first device and received by the server with the request to initialize the first device.

4. The method of claim 1, wherein the machine-readable credential is a Quick Response (QR) code; or
a barcode.

5. The method of claim 1, further comprising:
prior to transmitting the request for input of the first credential to the one or more administrative user devices, verifying validity of the request to initialize the first device.

6. The method of claim 5, wherein verifying validity of the request to initialize the first device comprises at least one of:
verifying that the first device is in a valid geographic area associated with the online account;
verifying that the request to initialize the first device is from a valid network address associated with the online account; or
verifying that the request to initialize the first device is associated with a valid user associated with the online account.

7. The method of claim 1, wherein the machine-readable credential is a restricted credential, and wherein validity of the restricted credential is restricted by at least one of:
a defined time limit;
a defined number of uses;
a defined geographic area; or
use by a defined user.

8. The method of claim 1, wherein the initialization of the first device comprises registering the first device against the online account.

9. A system comprising:
a processor in communication with storage, the processor configured to execute instructions from the storage to cause the system to:
receive, from a first device, a request associated with a secondary user to initialize the first device with an online account;
generate a machine-readable credential to enable initialization of the first device with the online account by:
transmitting, to one or more administrative user devices associated with at least one administrative user associated with the online account, the at least one administrative user being different from the secondary user, a request for input of a first credential specific to the at least one administrative user to approve the request to initialize the first device;
receiving, from at least one of the one or more administrative user devices, a response indicating input of the first credential specific to the at least one administrative user; and
responsive to the response received from the at least one of the one or more administrative user device, generating, at the server, the machine-readable credential that is different from the first credential, the machine-readable credential being useable by the secondary user and being not specific to the at least one administrative user; and
transmit the machine-readable credential to a secondary user device associated with the secondary user, the machine-readable credential being scannable by the first device to enable initialization of the first device with the online account.

10. The system of claim 9,
wherein the online account is a merchant account;
wherein the request to initialize the first device is a request to initialize the first device as a point-of-sale (POS) device associated with the merchant account; and
wherein the machine-readable credential enables initialization of the first device as the POS device associated with the merchant account.

11. The system of claim 9, wherein the request for input of the first credential includes information to enable the at least one administrative user to make a decision to approve the request to initialize the first device, the information including an identification of at least one of:
the secondary user associated with the request to initialize the first device;
an identification of a location associated with the request to initialize the first device; or
context information that was captured by the first device and received by the server with the request to initialize the first device.

12. The system of claim 9, wherein the processor is configured to execute instructions to further cause the system to:
prior to transmitting the request for input of the first credential to the one or more administrative user devices, verify validity of the request to initialize the first device.

13. A non-transitory computer-readable medium storing instructions that, when executed by a processor of a system, cause the system to:
receive, from a first device, a request associated with a secondary user to initialize the first device with an online account;
generate a machine-readable credential to enable initialization of the first device with the online account by:
transmitting, to one or more administrative user devices associated with at least one administrative user associated with the online account, the at least one administrative user being different from the secondary user, a request for input of a first credential specific to the at least one administrative user to approve the request to initialize the first device;
receiving, from at least one of the one or more administrative user devices, a response indicating input of the first credential specific to the at least one administrative user; and
responsive to the response received from the at least one of the one or more administrative user devices, generating, at the server, the machine-readable credential that is different from the first credential, the machine-readable credential being useable by the secondary user and being not specific to the at least one administrative user; and
transmit the machine-readable credential to a secondary user device associated with the secondary user, the machine-readable credential being scannable by the first device to enable initialization of the first device with the online account.

14. The method of claim 5, further comprising:
prior to transmitting the request for input of the first credential to the one or more administrative user devices, receiving a secondary credential associated with the secondary user;
wherein verifying validity of the request comprises verifying the secondary credential.

15. The system of claim 9, wherein the processor is configured to execute instructions to further cause the system to:
prior to transmitting the request for input of the first credential to the one or more administrative user devices, receive a secondary credential associated with the secondary user; and prior to transmitting the request for input of the first credential to the one or more administrative user devices, verify validity of the request to initialize the first device by verifying the secondary credential.

16. The non-transitory computer-readable medium of claim 13, wherein the instructions further cause the system to:
prior to transmitting the request for input of the first credential to the one or more administrative user devices, verify validity of the request to initialize the first device.

17. The non-transitory computer-readable medium of claim 13, wherein the instructions further cause the system to:
prior to transmitting the request for input of the first credential to the one or more administrative user devices, receive a secondary credential associated with the secondary user; and
prior to transmitting the request for input of the first credential to the one or more administrative user devices, verify validity of the request to initialize the first device by verifying the secondary credential.

18. The method of claim 3, wherein the request for input of the first credential includes context information captured by the first device to enable the at least one administrative user to make the decision to approve the request to initialize the first device, wherein the context information captured by the first device is at least one of:
a captured screenshot associated with the request to initialize the first device; or
a captured photograph associated with the request to initialize the first device.

19. The system of claim 9, wherein the machine-readable credential is a Quick Response (QR) code; or
a barcode.

20. The system of claim 12, wherein verifying validity of the request to initialize the first device comprises at least one of:
verifying that the first device is in a valid geographic area associated with the online account;
verifying that the request to initialize the first device is from a valid network address associated with the online account; or
verifying that the request to initialize the first device is associated with a valid user associated with the online account.

* * * * *